US006992145B2

(12) United States Patent
Ichikawa et al.

(10) Patent No.: US 6,992,145 B2
(45) Date of Patent: *Jan. 31, 2006

(54) GOLF BALL (75) Inventors: Yasushi Ichikawa, Chichibu (JP); Rinya Takesue, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 10/446,656

(22) Filed: May 29, 2003

(65) Prior Publication Data

US 2003/0224873 A1  Dec. 4, 2003

(30) Foreign Application Priority Data

May 31, 2002  (JP) .............................. 2002-159057

(51) Int. Cl.
*A63B 37/12* (2006.01)
*A63B 37/00* (2006.01)

(52) U.S. Cl. ................ 525/330.1; 525/221; 525/329.9; 473/371; 473/372; 473/373; 473/374; 473/385

(58) Field of Classification Search ................ 525/221, 525/329.1, 330.1, 329.9; 473/371, 372, 373, 473/374, 385
See application file for complete search history.

(56) References Cited

U.S. PATENT DOCUMENTS

| 5,885,172 | A | | 3/1999 | Hebert et al. | |
|---|---|---|---|---|---|
| 5,977,264 | A | * | 11/1999 | Ichikawa et al. | ......... 525/329.9 |
| 6,037,419 | A | * | 3/2000 | Takesue et al. | .......... 525/329.9 |
| 6,123,628 | A | * | 9/2000 | Ichikawa et al. | ........... 473/371 |
| 6,213,894 | B1 | | 4/2001 | Sullivan et al. | |
| 6,268,437 | B1 | * | 7/2001 | Takesue et al. | ............. 525/201 |
| 6,274,669 | B1 | * | 8/2001 | Rajagopalan | ................ 525/64 |
| 6,315,915 | B1 | | 11/2001 | Hebert et al. | |
| 6,562,906 | B2 | * | 5/2003 | Chen | .......................... 525/191 |
| 6,702,695 | B1 | * | 3/2004 | Higuchi et al. | ............. 473/378 |
| 2004/0106736 | A1 | * | 6/2004 | Takesue et al. | ............. 525/196 |

FOREIGN PATENT DOCUMENTS

| JP | 09-215775 | A | | 8/1997 |
|---|---|---|---|---|
| JP | 10-179795 | A | | 7/1998 |
| JP | 11-104271 | A | | 4/1999 |
| JP | 11-137726 | A | | 5/1999 |
| JP | 2001-000585 | A | | 1/2001 |
| JP | 2001054588 | | * | 2/2001 |

* cited by examiner

*Primary Examiner*—David J. Buttner
(74) *Attorney, Agent, or Firm*—Sughrue Mion, PLLC (57) ABSTRACT

In a golf ball comprising a core and a cover of plural layers, a cover inner layer is formed primarily of an ionomer resin in admixture with a compound containing at least two reactive functional groups and having a molecular weight of up to 20,000 and a cover outer layer is formed primarily of a non-ionomer resin. The ball is fully durable to repeated impact, and maintains good spin performance, rebound characteristics and feel even after repeated impact.

8 Claims, 2 Drawing Sheets

GOLF BALL

TECHNICAL FIELD

This invention relates to a multi-piece golf ball having improved durability as well as satisfactory spin, rebound and feel.

BACKGROUND ART

The current mainstream of multi-piece golf balls resides in those balls having a cover outer layer of a polyurethane elastomer base material and a cover inner layer of an ionomer resin base material. See JP-A 9-215775, JP-A 11-104271, U.S. Pat. No. 5,885,172 and U.S. Pat. No. 6,213,894.

Such multi-piece golf balls are generally manufactured by furnishing a core of vulcanized polybutadiene base rubber, injection molding or shape molding an ionomer resin thereon to form a cover inner layer of a predetermined gage, and enclosing it with a polyurethane elastomer to form a cover outer layer. Regrettably, difficulties arise in establishing a direct bond between the inner layer ionomer resin and the outer layer polyurethane elastomer. The insufficient joint between layers results in golf balls exhibiting reduced rebound and distance, degraded durability to repeated impact and unstable spin performance.

To overcome the bond problem, a number of proposals were made including blending of a thermoplastic resin in the cover inner or outer layer (JP-A 11-137726), pre-coating of an adhesive or primer on the inner layer (JP-A 10-179795, JP-A 2001-585), and treatment of the inner layer surface with a plasma or corona discharge (U.S. Pat. No. 6,315,915), all for increasing the bond strength between inner and outer layers.

However, all these approaches still left room for improvement. For instance, the blending of a thermoplastic resin and the coating of an adhesive or primer may lead to golf balls with poor rebound properties. The plasma or corona discharge treatment and the coating of an adhesive or primer often achieve insufficient adhesion, with no substantial improvements in physical properties of the ball being ascertained. If the introduction of a new expensive apparatus is necessary for such treatment to be carried out, not only the number of steps, but also the manufacturing cost is increased. It is thus desired to have a manufacturing method capable of improving the adhesion between inner and outer layers in a more simple and effective manner. There is a need for a golf ball in which cover inner and outer layers are tightly bonded.

SUMMARY OF THE INVENTION

An object of the present invention is to provide a golf ball having a cover including a layer formed primarily of an ionomer resin and a contiguous layer with improved adhesion therebetween, the ball exhibiting improved durability to repeated impact as well as satisfactory spin performance, rebound characteristics and feel.

The invention relates to a golf ball comprising a core and a cover of plural layers enclosing the core, wherein at least one layer of the cover is formed primarily of an ionomer resin. It has been found that when a layer is formed of the ionomer resin in admixture with a compound containing at least two reactive functional groups and having a molecular weight of up to 20,000, the layer of this admixture is significantly improved in adhesion to a contiguous layer formed primarily of any resin, especially a non-ionomer resin such as polyurethane elastomer. A satisfactory bond strength is established between these layers, as demonstrated by a bond strength of at least 0.5 N/4.5 mm as measured by the method to be described later. The present invention is predicated on this finding.

According to the invention, there is provided a golf ball comprising a core and a cover of plural layers enclosing the core. At least one layer of the cover is formed primarily of an ionomer resin in admixture with a compound containing at least two reactive functional groups and having a molecular weight of up to 20,000.

The compound is typically a monomer, oligomer or macromonomer containing at least two reactive functional groups. The reactive functional groups are typically hydroxyl, carbonyl, carboxyl or amino groups. Preferably, 100 parts by weight of the ionomer resin is in admixture with 0.1 to 100 parts by weight of the compound.

In a preferred embodiment, the cover includes one layer formed primarily of the ionomer resin and a layer formed primarily of a non-ionomer resin which is disposed contiguous thereto. The non-ionomer resin is preferably a polyurethane elastomer. More preferably, the cover includes the layer formed primarily of the ionomer resin as an inner layer and the layer formed primarily of the non-ionomer resin as an outer layer. Most often, a bond strength of at least 0.5 N/4.5 mm is established between the cover inner and outer layers.

DESCRIPTION OF THE PREFERRED EMBODIMENT

Figure 1:
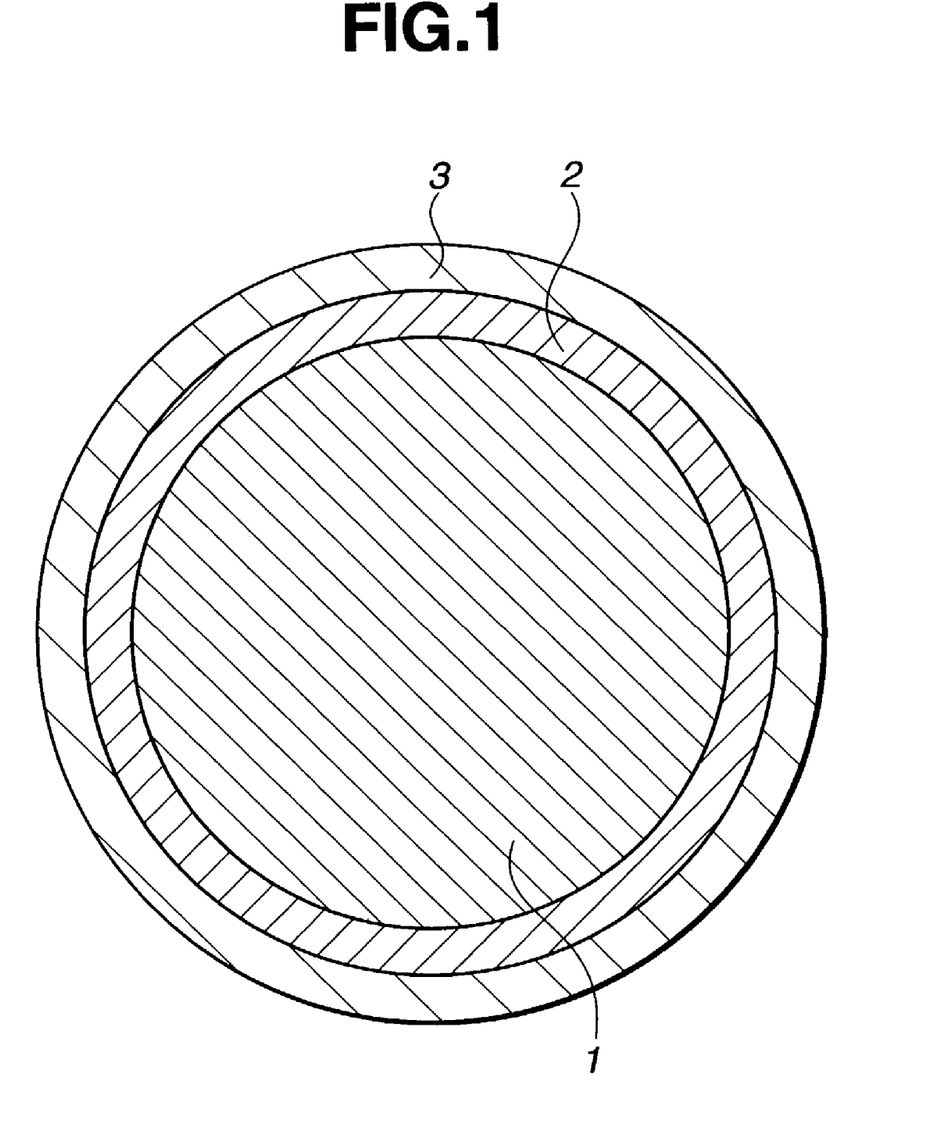
FIG. 1 is a schematic cross-sectional view of a golf ball according to one embodiment of the invention.

The golf ball of the invention includes a core and a cover of plural layers enclosing the core. Typically, as shown in FIG. 1, the golf ball is constructed by enclosing a core 1 with a cover consisting of an inner layer 2 and an outer layer 3.

The core of the golf ball may be either a solid core or a thread-wound core although the solid core is advantageous for the ball of the invention to exert better effects.

The solid core can be formed using a rubber composition containing, for example, a co-crosslinking agent, an organic peroxide, an inert filler and an organosulfur compound. The base rubber of the rubber composition is preferably composed primarily of polybutadiene.

The polybutadiene is not subject to any particular limitation. Any polybutadiene used as golf ball cores in the prior art may be employed, although 1,4-polybutadiene having a cis structure of at least 40% by weight is preferred. If desired, other rubbers such as natural rubber, polyisoprene rubber or styrene-butadiene rubber may be blended with polybutadiene to form the base rubber.

Exemplary co-crosslinking agents include unsaturated carboxylic acids and the metal salts of unsaturated carboxylic acids. Illustrative examples of unsaturated carboxylic acids include acrylic acid, methacrylic acid, maleic acid and fumaric acid. Acrylic acid and methacrylic acid are especially preferred. No particular limitation is imposed on the metal salts of unsaturated carboxylic acids. For example, any of the above-mentioned unsaturated carboxylic acids neutralized with the desired metal ions may be used. Specific examples include the zinc and magnesium salts of methacrylic acid and acrylic acid. Zinc acrylate is especially preferred.

The unsaturated carboxylic acids and/or metal salts thereof are generally used in an amount, per 100 parts of the base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much tends to give the golf ball a hard feel upon impact that is difficult to endure, whereas too little may diminish the rebound characteristics of the ball.

The organic peroxide may be a commercial product. Suitable examples include Percumil D (manufactured by NOF Corporation), Perhexa 3M (manufactured by NOF Corporation) and Luperco 231XL (manufactured by Atochem Co.). Any one or combinations of two or more peroxides may be used.

The organic peroxide is generally included in an amount, per 100 parts by weight of the base rubber, of at least 0.1 part by weight, preferably at least 0.3 part by weight, more preferably at least 0.5 part by weight, and most preferably at least 0.7 part by weight, but not more than 5 parts by weight, preferably not more than 4 parts by weight, more preferably not more than 3 parts by weight, and most preferably not more than 2 parts by weight. Too much or too little organic peroxide may fail to achieve a ball having a good feel upon impact and good durability and rebound characteristics.

Examples of inert fillers include zinc oxide, barium sulfate and calcium carbonate. Any one or combinations of two or more fillers may be used.

The inert filler is generally included in an amount, per 100 parts by weight of the base rubber, of at least 5 parts by weight, and preferably at least 7 parts by weight, but not more than 50 parts by weight, preferably not more than 40 parts by weight, more preferably not more than 30 parts by weight, and most preferably not more than 20 parts by weight. Too much or too little inert filler may fail to achieve a golf ball having an appropriate weight and good rebound characteristics.

If necessary, the rubber composition may include also an antioxidant, suitable examples of which include such commercial products as Nocrac NS-6, Nocrac NS-30 (both made by Ouchi Shinko Chemical Industry Co., Ltd.), and Yoshinox 425 (made by Yoshitomi Pharmaceutical Industries, Ltd.). Any one or combinations of two or more thereof may be used.

The antioxidant is generally included in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight. Too much or too little antioxidant may fail to achieve good rebound characteristics and durability.

It is preferable for the solid core of the golf ball to include an organosulfur compound so as to enhance the rebound characteristics of the ball. The organosulfur compound is not subject to any particular limitation, provided it is able to enhance the rebound characteristics of the ball. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and organosulfur compounds having 2 to 4 sulfurs, such as diphenylpolysulfides, dibenzylpolysulfides, dibenzoylpolysulfides, dibenzothiazoylpolysulfides and dithiobenzoylpolysulfides. Diphenyldisulfide and the zinc salt of pentachlorothiophenol are especially preferred.

It is recommended that the organosulfur compound be included in an amount, per 100 parts by weight of the base rubber, of generally at least 0.05 part by weight, preferably at least 0.1 part by weight, and most preferably at least 0.2 part by weight, but generally not more than 5 parts by weight, preferably not more than 4 parts by weight, more preferably not more than 3 parts by weight, and most preferably not more than 2.5 parts by weight. Too much organosulfur compound may cause the effects of addition to reach a point at which no further improvement occurs, whereas too little addition may fail to fully achieve the desired effects.

The solid core can be produced by subjecting the rubber composition containing the various above constituents to vulcanization and curing by a known method. Typically, the rubber composition is worked with a mixing apparatus such as a Banbury mixer or a roll mill, then compression molded or injection molded in a core mold. The molded body is then cured by appropriate heating at a temperature sufficient for the organic peroxide and the co-crosslinking agent to act. For instance, when dicumyl peroxide is used as the organic peroxide and zinc acrylate is used as the co-crosslinking agent, the molded body is generally heated at about 130 to 170° C., and preferably 150 to 160° C., for about 10 to 40 minutes, and preferably 12 to 20 minutes for curing into a solid core.

Preferably the solid core has a surface hardness of at least 45, more preferably at least 48, and up to 58, more preferably up to 55 in Shore D hardness. A surface hardness (Shore D hardness) within the indicated range can be achieved by properly selecting the types and amounts of constituents of the core composition, the types and amounts of peroxide and co-crosslinking agent, and the vulcanizing conditions. A solid core with too low a surface hardness may result in a ball having a soft feel on impact and too poor rebound characteristics to travel a distance. A solid core with too high a surface hardness may result in a ball having a hard feel on impact and travelling a skying trajectory.

The solid core may be given a construction composed of a single layer or a plurality of layers. Formation as a plurality of layers, and especially two layers, is preferred for control of the spin rate. When a solid core having a plurality of layers is used, "solid core surface hardness," as used herein, refers to the surface hardness of the outermost layer of the core.

The core has a diameter of preferably at least 25 mm, and most preferably at least 36 mm, but preferably not more than 40 mm, and most preferably not more than 38 mm. The core has a weight of preferably 20 to 32 g, and most preferably 27 to 30 g.

In the invention, the cover includes a plurality of layers, at least one of which is formed primarily of an ionomer resin. A cover layer disposed contiguous to the layer formed primarily of an ionomer resin is formed primarily of a non-ionomer resin. The layer formed primarily of an ionomer resin may be disposed either outside or inside the layer formed primarily of a non-ionomer resin. In a preferred embodiment, the cover consists of inner and outer layers, the cover inner layer is formed primarily of an ionomer resin, and the cover outer layer is formed primarily of a non-ionomer resin.

The ionomer resin used herein is not critical as long as it performs satisfactorily as the cover layer of golf balls. A variety of ionomer resins well known as the golf ball material can be used. Useful examples include metal ion-neutralized products of copolymers of an olefin and an unsaturated carboxylic acid as main monomers, metal ion-neutralized products of copolymers of an olefin, an unsaturated carboxylic acid and an unsaturated carboxylate as main monomers, and mixtures of any.

The olefins used herein are preferably alpha-olefins. Examples include ethylene, propylene, and 1-butene, with ethylene being especially preferred. The olefins may be used in admixture of any.

The unsaturated carboxylic acids are preferably α,β-unsaturated carboxylic acids having 3 to 8 carbon atoms. Examples include acrylic acid, methacrylic acid, itaconic acid, and maleic acid, with acrylic acid and methacrylic acid being especially preferred. The unsaturated carboxylic acids may be used in admixture of any.

The unsaturated carboxylates are preferably lower alkyl esters of the foregoing unsaturated carboxylic acids, but not limited thereto. Examples include methyl methacrylate, ethyl methacrylate, propyl methacrylate, butyl methacrylate, methyl acrylate, ethyl acrylate, propyl acrylate, and butyl acrylate, with butyl acrylate (n-butyl acrylate and isobutyl acrylate) being especially preferred. The unsaturated carboxylates may be used in admixture of any. The unsaturated carboxylates may serve to improve the flexibility of the ionomer resin.

In the preparation of copolymers of an olefin and an unsaturated carboxylic acid as main monomers, and copolymers of an olefin, an unsaturated carboxylic acid and an unsaturated carboxylate as main monomers, another monomer or monomers may be copolymerized as long as the objects of the invention are not compromised.

It is recommended that the content of unsaturated carboxylic acid (simply referred to as acid content) in the copolymer be at least 0.2 mol %, preferably at least 5 mol %, and up to 25 mol %, preferably up to 15 mol %. Too low an acid content may lead to a decline of rigidity and resilience, resulting in a golf ball with poor flight performance. Too high an acid content may detract from flexibility.

When a blend of the copolymer of an olefin and an unsaturated carboxylic acid as main monomers and the copolymer of an olefin, an unsaturated carboxylic acid and an unsaturated carboxylate as main monomers is used, they are preferably blended in a weight ratio of from 100:0 to 75:25. Too high a content of the copolymer of an olefin, an unsaturated carboxylic acid and an unsaturated carboxylate as main monomers may give a blend with a decline of resilience.

The ionomer resin used herein is preferably obtained by neutralizing the foregoing copolymer with at least one of mono- to tri-valent metal ions. Examples of mono- to tri-valent metal ions suitable for neutralization include sodium, potassium, lithium, magnesium, calcium, zinc, aluminum, ferrous and ferric ions.

Such metal ions may be introduced into the foregoing copolymers, for example, by reacting the copolymers with suitable compounds of mono- to tri-valent metal ions such as hydroxides, methoxides, ethoxides, carbonates, nitrates, formates, acetates and oxides.

The degree of neutralization of carboxylic acid in the copolymer with metal ions is preferably at least 10 mol %, more preferably at least 30 mol % and up to 100 mol %, more preferably up to 90 mol % based on the carboxylic acid groups. Too low a degree of neutralization may adversely affect resilience.

It is known that two or more ionomer resins containing different mono-, di- or tri-valent metal ions are blended in a suitable proportion to form an ionomer resin blend having a good balance of resilience and durability. Such blending is applicable to the present invention so that the layer formed primarily of ionomer resin is given a good balance of resilience and durability.

Commercial products may be used as the ionomer resin. Examples of metal ion-neutralized products of binary random copolymers of olefin and unsaturated carboxylic acid as main monomers include Himilan 1554, 1557, 1601, 1605, 1706 and AM7311 from Dupont-Mitsui Polychemicals Co., Ltd., Surlyn 7930 from E. I. Dupont, and Iotek 3110 and 4200 from ExxonMobil Chemical; and examples of metal ion-neutralized products of ternary random copolymers of olefin, unsaturated carboxylic acid and unsaturated carboxylate as main monomers include Himilan 1855, 1856 and AM7316 from Dupont-Mitsui Polychemicals Co., Ltd., Surlyn 6320, 8320, 9320 and 8120 from E. I. Dupont, and Iotek 7510 and 7520 from ExxonMobil Chemical.

Of the metal ion-neutralized copolymers, zinc-neutralized ionomer resins are preferred and available as Himilan 1706, 1557 and AM7316.

In the invention, the ionomer resin described above is used in admixture with a compound containing at least two reactive functional groups and having a molecular weight of up to 20,000. The admixing of such a compound with the ionomer resin improves the adhesion of one cover layer formed primarily of the ionomer resin to another cover layer disposed contiguous thereto, especially a cover layer formed primarily of a non-ionomer resin.

The compounds containing at least two reactive functional groups include monomers, oligomers and macromonomers each containing at least two, preferably at least three in total, reactive functional groups of one or more types and having a molecular weight of up to 20,000, preferably up to 5,000. The number of reactive functional groups is usually up to 5, preferably up to 4, though a particular upper limit need not be imposed.

As used herein, the term "monomer" is a simple molecule. The term "oligomer" refers to a low molecular weight product obtained from a monomer used in the synthesis of a polymer and generally covers from a dimer to a molecular weight of several thousand. The term "macromonomer" refers to an oligomer terminated with a polymerizable functional group, which is utilized in the synthesis of graft polymers through copolymerization with various functional comonomers. The macromonomer generally has a molecular weight of several thousand to several ten thousand. They are intermediates for the synthesis of plastics and elastomers and used as starting material to graft polymers. Oligomers and macromonomers having various functions are recently of great interest.

The reactive functional groups are not critical as long as they can improve the adhesion between resin layers. Preferred reactive functional groups include hydroxyl, carbonyl, carboxyl and amino groups. Hydroxyl groups are especially preferred for the admixture with ionomer resin because of a minimal influence on melt flow rate.

Examples of suitable monomers include, but are not limited to, 1,3-butanediol, 1,6-hexanediol and trimethylolpropane. Examples of suitable oligomers and macromonomers include, but are not limited to, polyethylene glycol, polyhydroxypolyolefin oligomers, modified low molecular weight polyethylene, modified low molecular weight polypropylene, modified low molecular weight polystyrene, modified liquid polybutadiene and modified liquid rubber. Of these, polyhydroxypolyolefin oligomers and trimethylolpropane are especially preferred. These compounds may be used alone or in combination of two or more.

Commercial products may be used as the monomer, oligomer and macromonomer. Trimethylolpropane is available from Mitsubishi Gas Chemical Co., Inc. Polyhydroxypolyolefin oligomers (the number of carbons in backbone 150 to 200, terminated with hydroxyl group) are available under the trade name of Polytail H from Mitsubishi Chemical Corp.

The compounds having a molecular weight of up to 20,000 as typified by monomers, oligomers and macromonomers are often liquid at room temperature or (semi) solid having a low melting temperature or a low melt viscosity. By blending such a normally liquid compound or (semi)solid compound having a low melting temperature or a low melt viscosity in the ionomer resin, the ionomer resin is kept tacky to another resin which is hot melted and brought in contact therewith, leading to improved adhesion. Additionally, blending a compound having at least two reactive functional groups in the ionomer resin improves the adhesion of the ionomer resin to a layer of another golf ball material to be disposed contiguous thereto or in surface contact therewith.

Moreover, since the monomers, oligomers and macromonomers have a relatively low molecular weight and thus, a low melt viscosity as compared with high molecular weight copolymers like thermoplastic resins and thermoplastic elastomers, they minimize the risk of compromising the ionomer resin's own workability and act like plasticizers to improve fluidity. They minimize the risk of compromising the rebound characteristics of the golf ball. If the compound to be blended with the ionomer resin has too high a molecular weight, it can compromise the ionomer resin's own workability or detract from the rebound characteristics of the golf ball.

It is noted that JP-A 2001-120686 describes the addition to golf ball materials of higher fatty acids such as stearic acid, 12-hydroxystearic acid, behenic acid, oleic acid, linoleic acid, linolenic acid, arachidic acid and lignoceric acid, and preferably stearic acid, arachidic acid, behenic acid and lignoceric acid. These compounds having only one reactive functional group in their molecular structure (also referred to as oils, fats, lubricants and surfactants having only one reactive functional group per molecule) are not effective for improving bond strength.

The amount of the compound containing at least two reactive functional groups blended is preferably 0.1 to 100 parts by weight, more preferably 0.1 to 50 parts by weight, most preferably 0.1 to 20 parts by weight per 100 parts by weight of the ionomer resin. Too small an amount of the compound may fail to achieve the desired effect whereas too large an amount may compromise the physical properties of the golf ball.

Any desired method may be employed in blending the ionomer resin with the compound containing at least two reactive functional groups and having a molecular weight of up to 20,000 as long as they are intimately mixed. The preferred blending method is by heat mixing. In the heat mixing, the temperature is in the range of 150 to 300° C., especially 180 to 250° C. and the mixing time is determined as appropriate, usually about 1 to 20 minutes.

In the layer formed primarily of the ionomer resin, various additives may be incorporated if desired. Such additives include pigments, dispersants, antioxidants, UV absorbers and light stabilizers. Other useful additives are inorganic fillers such as zinc oxide, barium sulfate and titanium dioxide.

Disposed contiguous to the layer formed primarily of the ionomer resin is a layer formed primarily of a non-ionomer resin. The non-ionomer resin used herein is not critical as long as it can serve as the cover. All materials known to use in golf ball covers are useful. Examples include thermoplastic elastomers such as polyester elastomers, polyamide elastomers, and polyurethane elastomers, with polyurethane elastomers being preferred.

The polyurethane elastomer is not critical so long as it is an elastomer composed primarily of polyurethane. Preferred are polyurethane elastomers made up of polymeric polyols as the soft segments, and monomolecular chain extenders and diisocyanates as the hard segments.

Any polymeric polyol may be used without particular limitation. Examples include polyester polyols and polyether polyols, of which polyether polyols are preferred for the preparation of polyurethanes having excellent impact resilience and low-temperature properties.

Suitable examples of polyether polyols include polytetramethylene glycol and polypropylene glycol. Polytetramethylene glycol is preferred. The polyether polyols preferably have a number average molecular weight of about 1,000 to 5,000, especially about 1,500 to 3,000.

Any diisocyanate may be used without particular limitation. Illustrative examples include aromatic diisocyanates such as 4,4'-diphenylmethane diisocyanate, 2,4-toluene diisocyanate, 2,6-toluene diisocyanate, and aliphatic diisocyanates such as hexamethylene diisocyanate. In consideration of the preferred embodiment wherein the polyurethane elastomer is used in admixture with an isocyanate mixture as will be described later, the use of 4,4'-diphenylmethane diisocyanate in the polyurethane production is preferred for reaction stability with the isocyanate mixture.

Any monomolecular chain extender may be used without particular limitation. Use may be made of ordinary polyhydric alcohols and amines. Specific examples include 1,4-butylene glycol, 1,2-ethylene glycol, 1,3-propylene glycol, 1,3-butanediol, 1,6-hexylene glycol, 2,2-dimethyl-1,3-propanediol, 1,3-butylene glycol, dicyclohexylmethylmethanediamine (hydrogenated MDA) and isophoronediamine (IPDA). The chain extenders preferably have an average molecular weight of about 20 to 15,000.

The polyurethane elastomers may be commercial products. Illustrative examples include Pandex T7298, TR3080, T8290, T8295 and T8260 (DIC Bayer Polymer, Ltd.), and Resamine 2593 and 2597 (Dainichi Seika Colour & Chemicals Mfg. Co., Ltd.). These elastomers may be used alone or in admixture of two or more.

In the cover outer layer, a composition comprising the aforementioned polyurethane elastomer and a specific isocyanate mixture is preferably used. The blending of the specific isocyanate mixture has the advantage that a golf ball having a cover outer layer formed of a composition comprising the polyurethane elastomer and the isocyanate mixture is improved in feel, control, cut resistance, scuff resistance and crack durability on repeated impact, as compared with a golf ball having a cover outer layer formed solely of the polyurethane elastomer.

The specific isocyanate mixture refers to a mixture prepared by dispersing (i) a compound having as functional groups at least two isocyanate groups per molecule in (ii) a thermoplastic resin that is substantially non-reactive with isocyanate groups.

The compound (i) having at least two isocyanate groups may be any of the isocyanate compounds used in the prior art relating to polyurethanes. It is usually selected from among an aromatic isocyanate compound, a hydrogenated aromatic isocyanate compound, an aliphatic diisocyanate and an alicyclic diisocyanate, but not limited thereto.

Suitable examples of the aromatic isocyanate compound include 2,4-toluene diisocyanate, 2,6-toluene diisocyanate, mixtures of 2,4-toluene diisocyanate with 2,6-toluene diisocyanate, 4,4'-diphenylmethane diisocyanate, m-phenylene diisocyanate and 4,4'-biphenyl diisocyanate. Exemplary of the hydrogenated aromatic isocyanate compound is dicyclohexylmethane diisocyanate. Suitable examples of the aliphatic diisocyanate include tetramethylene diisocyanate, hexamethylene diisocyanate (HDI) and octamethylene diisocyanate. Exemplary of the alicyclic diisocyanate is xylene diisocyanate.

The thermoplastic resin (ii) is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins and polyester elastomers (e.g., polyether-ester block copolymers, polyester-ester block copolymers). Of these, polyether-ester block copolymers are especially preferred for good impact resilience and strength.

When the isocyanate mixture is prepared, it is desirable for components (ii) and (i) to be mixed in a weight ratio of from 100/5 to 100/100, and especially from 100/10 to 100/40. If the proportion of component (i) relative to component (ii) is too small, more isocyanate mixture must be added to achieve sufficient addition for the crosslinking reaction with the polyurethane elastomer. In such cases, component (ii) exerts a more effect, which may render inadequate the physical properties of the polyurethane elastomer after crosslinking. Too large a proportion of component (i) may cause slippage to occur during mixing, making it difficult to prepare the mixture.

The isocyanate mixture can be prepared by blending component (i) into component (ii) and thoroughly kneading them together at a temperature of 130 to 250° C. in a roll mill or Banbury mixer, then carrying out pelletization or cooling, followed by grinding.

The isocyanate mixture may be a commercial product, a preferred example of which is Crossnate EM30 (Dainichi Seika Colour & Chemicals Mfg. Co., Ltd.), but not limited thereto.

The isocyanate mixture is generally included in an amount of at least 1 part, preferably at least 5 parts, and more preferably at least 10 parts by weight, and up to 100 parts, preferably up to 50 parts, and more preferably up to 30 parts by weight, per 100 parts by weight of the polyurethane elastomer. Too small an amount of the isocyanate mixture may fail to achieve a sufficient crosslinking reaction, thus preventing enhancement of physical properties. On the other hand, too much may result in greater discoloration over time or due to the effects of heat and ultraviolet light, and may also have other undesirable effects, such as lowering resilience.

In the preferred embodiment described above, the cover outer layer of the inventive golf ball is formed primarily of a polyurethane elastomer. The polyurethane elastomer composition may also include various additives. Examples of such additives include pigments, dispersants, antioxidants, ultraviolet absorbers, ultraviolet stabilizers, plasticizers and inorganic fillers (e.g., zinc oxide, barium sulfate, titanium dioxide).

The outer layer preferably has a surface hardness of 40 to 65, more preferably 45 to 60 in Shore D hardness. If the hardness of the outer layer is too low, the ball may receive too much spin and fail to travel a distance. If the hardness of the outer layer is too high, the ball may become difficult for the player to control due to reduced spin susceptibility, and lose crack durability to repeated impact and scuff resistance.

The cover inner layer preferably has a thickness of at least 0.3 mm, more preferably at least 1.0 mm, and up to 2.0 mm, more preferably up to 1.8 mm. Too large an inner layer thickness may lead to a loss of rebound whereas too small an inner layer thickness may lead to poor durability.

The cover outer layer preferably has a thickness of at least 0.3 mm, more preferably at least 1.0 mm, and up to 2.0 mm, more preferably up to 1.8 mm. Too large an outer layer thickness may lead to a loss of rebound whereas too small an outer layer thickness may lead to poor durability.

The golf ball of the invention is generally prepared by forming a plurality of cover layers on the core, and typically by forming a cover inner layer on the core and forming a cover outer layer thereon. Any well-known method may be used in forming the cover inner and outer layers. An injection molding method is useful while a compression molding method involving preforming a pair of hemispherical cups from an appropriate cover stock, followed by compression molding is also employable.

In the preferred embodiment, the cover inner layer is formed of a composition primarily comprising the ionomer resin in admixture with the compound containing at least two reactive functional groups, and the cover outer layer is formed of a composition primarily comprising the non-ionomer resin. In a more preferred procedure, once the inner layer is formed, it is surface polished, and the outer layer is formed on the surface-polished inner layer. Useful polishing techniques include blasting, and polishing using a diamond wheel or diamond paper.

According to the invention, the admixing of a compound containing at least two reactive functional groups and having a molecular weight of up to 20,000 with an ionomer resin improves the adhesion of the cover layer made thereof to another cover layer disposed contiguous thereto, especially a cover layer formed primarily of a non-ionomer resin, permitting the outer layer to be formed directly on the inner layer to establish a tight bond therebetween without a need for primer treatment or the like. The bond strength between the layers can reach at least 0.5 N/4.5 mm, especially at least 0.8 N/4.5 mm as measured by the method to be described later.

As usual, the golf ball of the invention has a plurality of dimples formed on its surface. The number of dimples is usually 350 to 500, preferably 370 to 480, and more preferably 390 to 450, though not critical. The dimples may include those of two or more types which differ in diameter and/or depth. Preferably the dimples have a diameter of 1.4 to 4.5 mm, especially 2.0 to 4.3 mm and a depth of 0.15 to 0.25 mm, especially 0.17 to 0.23 mm.

The golf ball of the invention can be manufactured to parameters which conform with the Rules of Golf, without departing from the scope of the invention. That is, the ball may be produced to a diameter of not less than 42.67 mm and a weight of not greater than 45.93 g.

EXAMPLE

Examples of the invention and comparative examples are given below by way of illustration, and are not intended to limit the invention.

Examples and Comparative Examples

A cover inner layer of the composition shown in Table 1 was injection molded on the surface of a solid core A, described below. The surface of the inner layer was treated by the technique shown in Table 1. Thereafter, a cover outer layer of the composition shown below was injection molded on the inner layer in a mold having a negative dimple pattern. The cover was painted, obtaining a three-piece solid golf ball.

The golf ball was examined for bond strength, rebound (initial velocity), and impact durability by the tests described below. The results are shown in Table 2.

Solid Core

A composition was prepared by combining 100 parts by weight of polybutadiene (BR11 by JSR Corp.) with 34.1 parts by weight of zinc acrylate, 0.6 part by weight of dicumyl peroxide (Percumil by NOF Corp.), 0.6 part by weight of 1,1-bis(t-butylperoxy)-3,3,5-trimethylsiloxane (Perhexa 3M-40 by NOF Corp.), 0.2 part by weight of an antioxidant (Nocrac NS-6 by Ouchi Shinko Chemical Industry Co., Ltd.), 18.0 parts by weight of zinc oxide, 1 part by weight of the zinc salt of pentachlorothiophenol, and 5 parts by weight of zinc stearate. In a core mold, the composition was vulcanized at a temperature of 157° C. for a time of 15 minutes to form the solid core A which was used in Examples and Comparative Examples. The solid core A had an outer diameter of 36.40 mm and a surface Shore D hardness of 57.

Cover Inner Layer

The composition of the cover inner layer is shown in Table 1.

Inner Layer Treatment

Spherical surface polishing is buffing on the injection molded inner layer for removing burrs using diamond paper.

Plasma treatment is irradiation of a low-temperature plasma of argon gas. The irradiation conditions include a frequency of 13.56 MHz, a power of 80 W, a time of 30 seconds, an initial irradiation atmosphere of $1 \times 10^{-3}$ Torr, and an atmosphere of 0.1 Torr during plasma treatment (gas introduction).

Primer treatment is coating of a chlorinated polyethylene primer RB-182 (Nihon Bee Chemical Co., Ltd.) to a buildup of 5 μm or less.

Cover Outer Layer

A Pandex compound was prepared by combining 100 parts by weight of a thermoplastic elastomer Pandex T8295 (DIC Bayer Polymer Co., Ltd.) with 4 parts by weight of titanium dioxide, 1.5 parts by weight of polyethylene wax, 0.06 part by weight of ultramarine, 0.4 part by weight of amide wax, and 0.3 part by weight of silicone oil and heat mixing in a twin screw extruder.

As the isocyanate mixture, use was made of an isocyanate master batch Crossnate EM30 (Dainichi Seika Colour & Chemicals Mfg. Co., Ltd.) which contained 30% by weight of 4,4'-diphenylmethane diisocyanate in polyester elastomer as the base resin and had an isocyanate concentration of 5 to 10% by weight as measured by amine back-titration according to JIS K1556.

Immediately before molding, the Pandex compound and the isocyanate mixture were dry blended in a weight ratio of 100/10. Using an injection molding machine, the blend was injected over the inner layer to form a cover outer layer.

Physical properties of the ball were measured as follows.

Bond Strength

Figure 2:
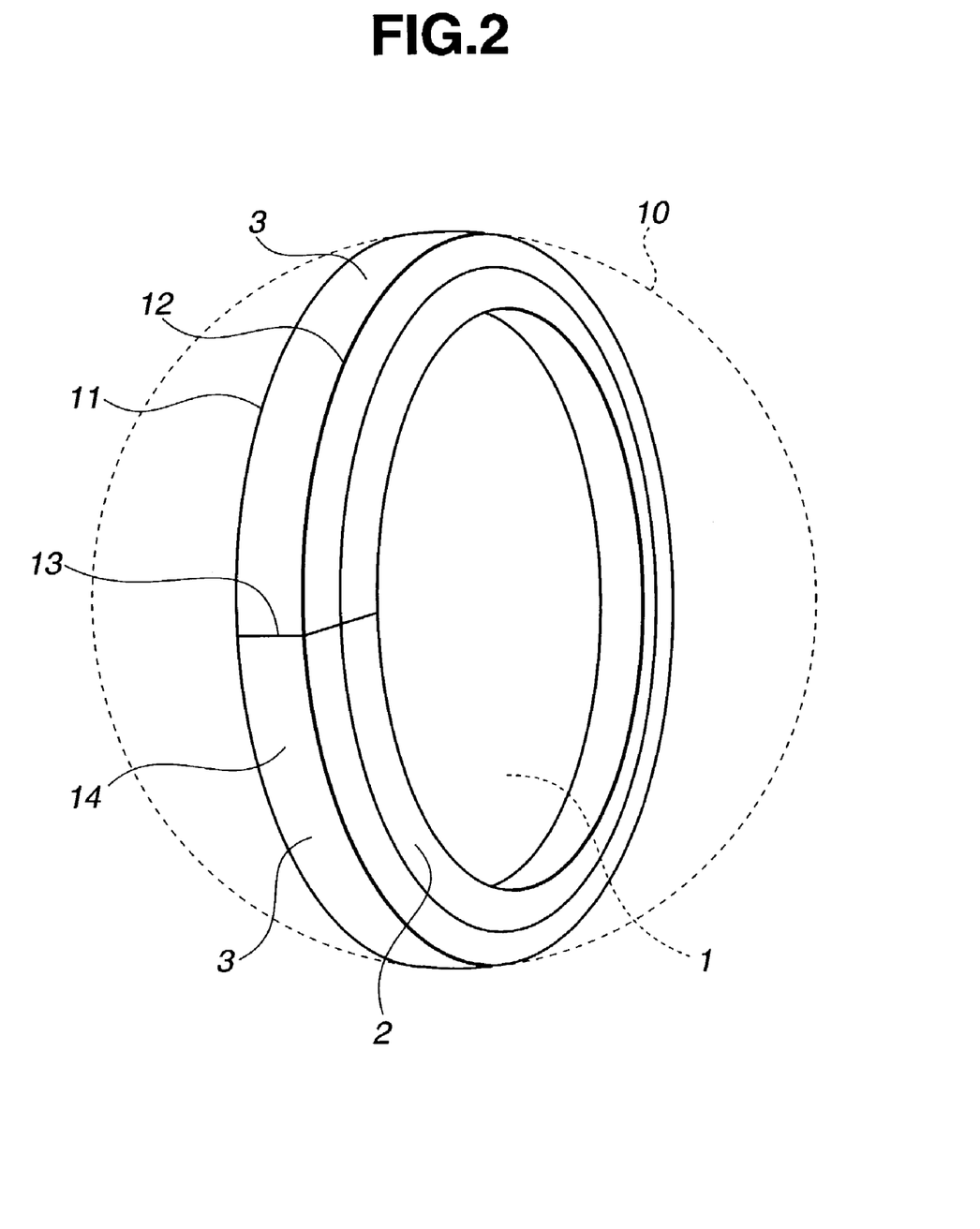
FIG. 2 illustrates how to produce a specimen subject to a test for measuring the bond strength between inner and outer layers.

Referring to FIG. 2, a golf ball 10 consisting of a core 1, an inner layer 2 and an outer layer 3 is shown. Two parallel cuts 11 and 12 spaced 4.5 mm apart are incised throughout the outer and inner layers 3 and 2 so that the centerline

TABLE 1

|  |  | Example | | | | | | Comparative Example | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
| Inner layer composition (pbw) | Surlyn 8945 | 35 | 35 | 35 | 35 | 35 | 35 | 35 | 35 | 35 | 35 | 50 | 45 |
|  | Himilan 1605 | 35 | 35 | 35 | 35 | 35 | 35 | 35 | 35 | 35 | 35 | 50 | 45 |
|  | Dynaron 6100P | 25 | 20 | 15 | 10 | 30 | 30 | 30 | 30 | 30 | 30 |  |  |
|  | Bondfast 2C |  |  |  |  |  |  |  |  |  |  |  | 10 |
|  | Polytail H | 5 | 10 | 15 | 20 | 1 | 2 |  |  |  |  |  |  |
|  | TMP |  |  |  |  |  |  |  |  |  |  |  |  |
| Inner layer treatment | Spherical surface polishing | ○ | ○ | ○ | ○ | ○ | ○ |  | ○ | ○ | ○ | ○ | ○ |
|  | Plasma treatment |  |  |  |  |  |  |  |  | ○ |  |  |  |
|  | Primer treatment |  |  |  |  |  |  |  |  |  | ○ |  |  |

Note:
Surlyn 8945: ionomer resin (Dupont)
Himilan 1605: ionomer resin (Dupont-Mitsui Polychemicals Co., Ltd.)
Dynaron 6100P: olefin base thermoplastic elastomer (JSR Corporation), containing no reactive polar groups
Bondfast 2C: reactive ethylene copolymer (ethylene-glycidyl methacrylate copolymer. Sumitomo Chemical Co., Ltd.), glycidyl methacrylate content 6 wt %, m.p. 105° C.
Polytail H: polyhydroxypolyolefin oligomer (Mitsubishi Chemical Corp.), Mw approx. 2,000–5,000, m.p. 60–70° C.
TMP: trimethylolpropane (Mitsubishi Gas Chemical Co., Inc.), Mw 134.17, m.p. 56–59° C.

between the two cuts 11 and 12 is coincident with the outermost circumference of the golf ball, i.e., the greatest circumference. A cut 13 perpendicular to the two cuts 11 and 12 is incised throughout the outer and inner layers 3 and 2. A laminate of the inner and outer layers 2 and 3 is then peeled from the core 1 while keeping the inner and outer layers 2 and 3 stuck together, obtaining a band-shaped specimen for bond strength measurement.

Using an Instron tester, the specimen of 4.5 mm wide was measured for bond strength according to JIS K6256 "Adhesion test method on vulcanized rubber and thermoplastic rubber." The clamp was moved at a speed of 100 mm/min. The tensile strength from a deflection 20 mm to 200 mm when the inner and outer layers were peeled apart was averaged for four specimens, which gives a bond strength (unit N).

MFR

Melt flow rate was measured according to JIS K6992-2, Annex 4.1 at a test temperature of 190° C. and a load of 21.18 N.

Rebound (Initial velocity):

Initial velocity as an index of rebound was measured in accordance with USGA rules. A higher value indicates better rebound.

Durability to Repeated Impact

Each ball was repeatedly struck with a driver (W#1) at a head speed of 50 m/s. The number of strikes required to produce a consecutive decline of 3% in the ball rebound was counted. A relative index was computed based on a value of 100 for the number of catastrophic strikes to the golf ball of Example 1. A lower value indicates poorer durability.

the inner layer was subjected to no treatment or polishing, but they are still insufficient in rebound and durability to repeated impact.

Comparative Example 6 in which the inner layer was formed of a heated admixture of an ionomer resin with a thermoplastic random copolymer having a relatively high melting point and a high molecular weight rather than monomers, oligomers or macromonomers was somewhat improved in bond strength over Comparative Example 5, but the mixture was inefficient to mold due to a significantly reduced fluidity. The ball of Comparative Example 6 was low in rebound as compared with Comparative Example 5 and had insufficient durability to repeated impact.

In contrast, Examples 1 to 6 in which the inner layer was formed of a heated admixture of an ionomer resin with a monomer or oligomer having reactive functional groups exhibited a high bond strength between the inner layer and the outer layer of polyurethane elastomer, which eventually led to significant improvements in rebound and durability to repeated impact. The admixture of an ionomer resin with a monomer or oligomer was good in flow, with improvements in molding being observed.

There have been described golf balls which are fully durable to repeated impact, and maintain good spin performance, rebound characteristics and feel even after repeated impact.

Japanese Patent Application No. 2002-159057 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

TABLE 2

| Physical | Example | | | | | | Comparative Example | | | | | |
| --- | --- | --- | --- | --- | --- | --- | --- | --- | --- | --- | --- | --- |
| properties | 1 | 2 | 3 | 4 | 5 | 6 | 1 | 2 | 3 | 4 | 5 | 6 |
| Bond strength (N/4.5 mm) | 1.47 | 1.97 | 3.43 | 3.92 | 3.43 | 3.92 | 0.29 | 0.29 | 0.69 | 0.98 | 0.29 | 0.35 |
| MFR @ 190° C. (dg/min) | 2.8 | 3.0 | 3.2 | 3.4 | 2.7 | 2.9 | 2.0 | 2.0 | 2.0 | 2.0 | 3.5 | 0.5 |
| Initial velocity (m/sec) | 77.2 | 77.2 | 77.2 | 77.2 | 77.2 | 77.2 | 76.6 | 76.6 | 76.8 | 76.8 | 77.1 | 76.3 |
| Durability index | 100 | 100 | 100 | 100 | 100 | 100 | 50 | 50 | 70 | 90 | 40 | 60 |

Comparative Example 1 in which the inner layer of ionomer resin was not treated at all exhibited a low bond strength between the outer layer of polyurethane elastomer and the inner layer of ionomer resin as well as poor rebound and low durability to repeated impact.

Comparative Examples 2 and 5 in which the inner layer of ionomer resin was treated only by spherical surface polishing exhibited a low bond strength between the outer layer of polyurethane elastomer and the inner layer of ionomer resin, like Comparative Example 1, and especially, low durability to repeated impact.

Comparative Examples 3 and 4 in which the inner layer was subjected to plasma treatment and primer treatment, respectively, exhibit improvements over those balls in which

The invention claimed is:

1. A golf ball, comprising a core and a cover of plural layers enclosing the core, wherein at least one layer of the cover is formed primarily of an ionomer resin in admixture with a compound containing at least two reactive functional groups and having a molecular weight of up to 20,000, and one layer of the cover which is disposed contiguous to the layer formed primarily of the ionomer resin is formed primarily of a polyurethane elastomer which is blended with an isocyanate mixtures, wherein said isocyanate mixture is a mixture prepared by dispersing (i) a compound having as functional groups at least two isocyanate groups per molecule in (ii) a thermoplastic resin that is substantially non-reactive with isocyanate groups.

2. The golf ball of claim 1 wherein the compound is a monomer, oligomer or macromonomer containing at least two reactive functional groups.

3. The golf ball of claim 1 wherein the reactive functional groups are hydroxyl, carbonyl, carboxyl or amino groups.

4. The golf ball of claim 1 wherein 100 parts by weight of the ionomer resin is in admixture with 0.1 to 100 parts by weight of the compound.

5. The golf ball of claim 1 wherein the cover includes the layer formed primarily of the ionomer resin as an inner layer and the layer formed primarily of the polyurethane elastomer which is blended with an isocyanate mixture as an outer layer.

6. The golf ball of claim 5 wherein a bond strength of at least 0.5 N/4.5 mm is established between the cover inner and outer layers.

7. The golf ball of claim 1 wherein the reactive functional groups are hydroxyl groups.

8. The golf ball of claim 7 wherein the compound is polyhydroxypolyolefin oligomer or trimethylolpropane.

* * * * *